United States Patent [19]

Jones

[11] Patent Number: 5,030,086
[45] Date of Patent: Jul. 9, 1991

[54] AGRICULTURAL BURNER DEVICE

[76] Inventor: Ronald C. Jones, Rte. #1, Box 250, Neillsville, Wis. 54456

[21] Appl. No.: 543,040

[22] Filed: Jun. 25, 1990

[51] Int. Cl.⁵ .................................................. F23D 11/44
[52] U.S. Cl. .................................... 431/207; 431/211; 126/271.2 C; 47/1.44
[58] Field of Search ...................... 126/271.1, 271.2 R, 126/271.2 C, 249–251; 47/1.44; 431/207, 209, 211; 239/172, 176, 587

[56] References Cited

U.S. PATENT DOCUMENTS 2,530,894 11/1950 McLemore .................. 126/271.2 C
3,177,922 4/1965 Pardee .......................... 126/271.2 C
3,727,346 4/1973 Kramer ......................... 126/271.2 C Primary Examiner—James C. Yeung

[57] ABSTRACT

An agricultural burner device produces a flame from the combustion of liquid propane and is used to control weeds, insects, vines, micro-organisms, and the like. The burner devices are typically mounted on the draw bar of an agricultural implement, and are arranged in pairs to effectively treat the area of a row crop adjacent to the base of the crop plant during movement of the implement. An auxiliary burner mechanism is attached to the burner device for desiccation of vines.

6 Claims, 2 Drawing Sheets

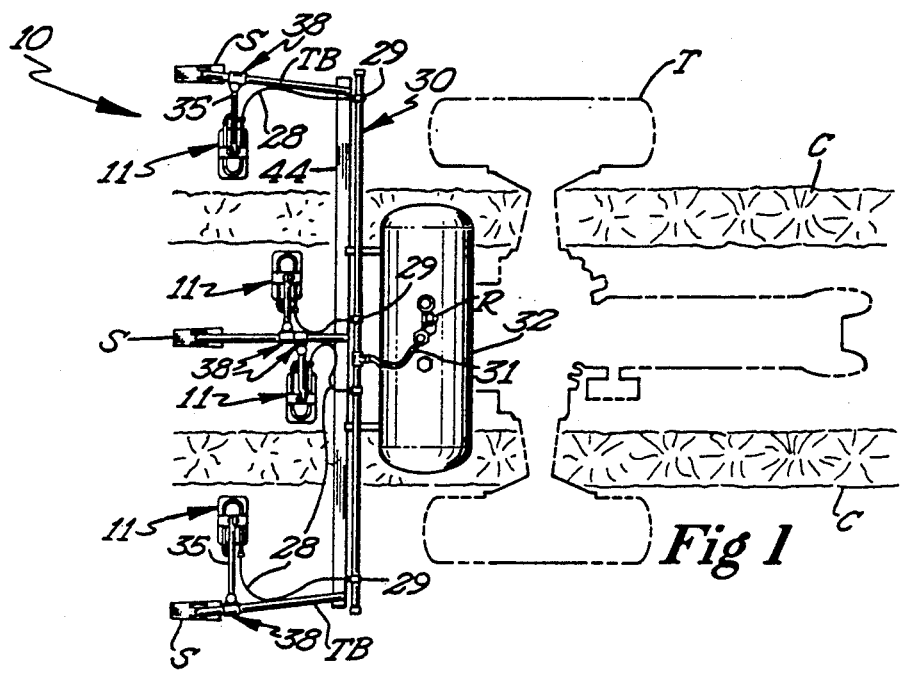
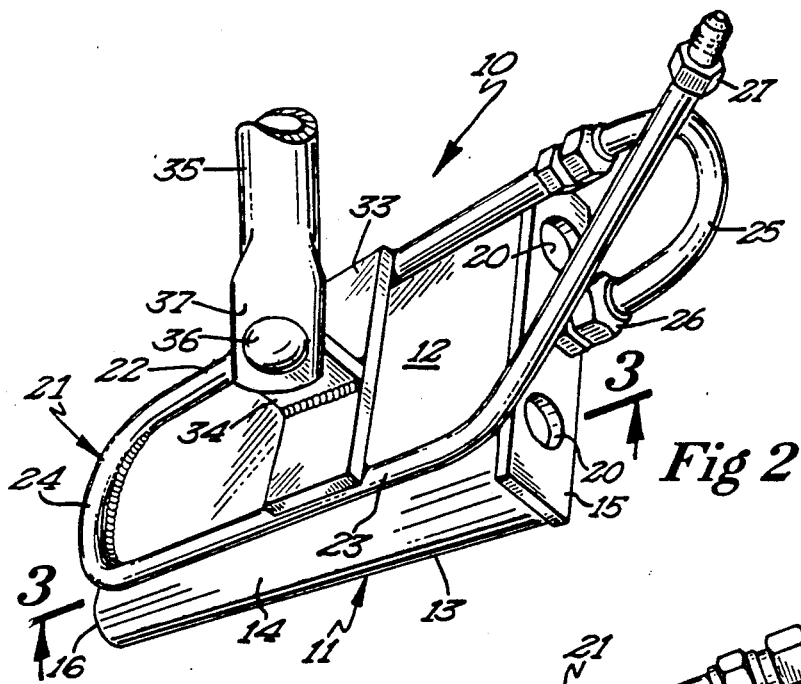
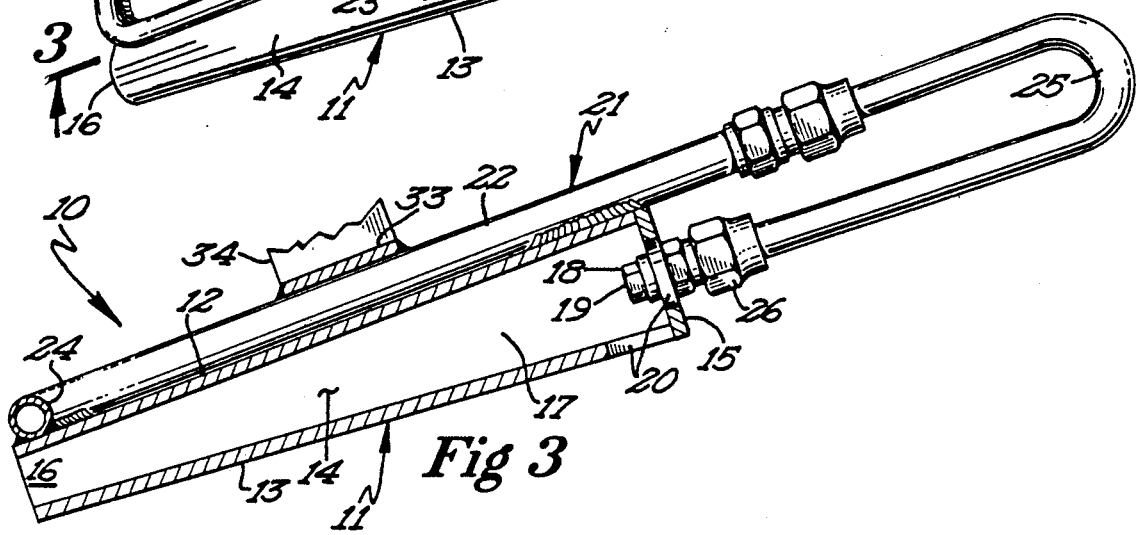
Fig 1
Fig 2
Fig 3

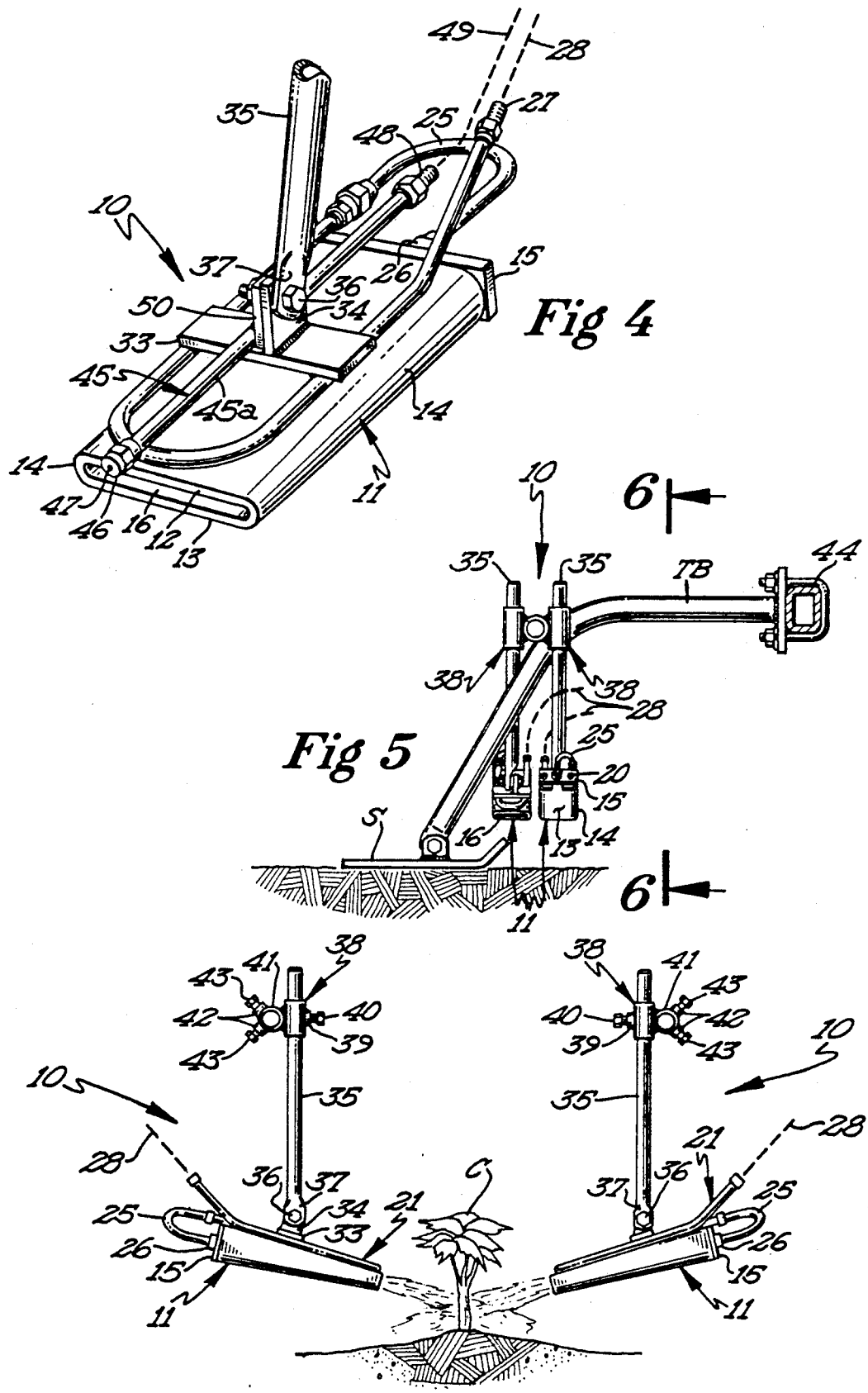

AGRICULTURAL BURNER DEVICE

This invention relates to an agricultural burner device for use in destroying weeds, insects, vines and the like.

BACKGROUND OF THE INVENTION

Chemical pesticides and herbicides have been a primary means used by the agricultural industry for controlling insects, weeds and the like. Although chemical pesticides and herbicides are highly efficient in controlling weeds and insects, these chemicals harm biological life in the soil, and toxic residues of these chemicals pollute the subsoil and ground water.

Certain burner devices have been developed for use in controlling weeds, insects, and the like, but most of the commercially exploited burner devices have been discontinued. It is believed that the particular design and construction of these prior art burner devices resulted in their abandonment.

SUMMARY OF THE INVENTION

An object of this invention is to provide a novel and improved agricultural burner device for use with an agricultural implement which is operable for destroying noxious weeds, insects, and the like. In carrying out the invention, the novel burner devices are mounted on the draw bar of an agricultural implement. Typically, a pair of devices are mounted on a draw bar for each crop row so that the flame produced by each device is directed towards a zone adjacent each crop plant. In this way, weeds, insects, micro-organisms and the like located closely adjacent the crop row may be destroyed.

The novel burner device includes a burner housing which is adjustably secured to one end of an elongate standard to permit the burner housing to be pivotally adjusted relative to the standard. The standard is adjustably secured to the implement draw bar by connector mechanism that permits rotation of the standard about its longitudinal axis, and also permits angular adjustment of the standard relative to the draw bar.

A supply pipe is connected with a tank containing liquid propane and is connected to a nozzle secured to the rear wall of the burner housing. The supply pipe is of U-shaped configuration and is secured to the external surface of the top wall of the burner housing and is heated during operation of the device so that liquid propane is vaporized before reaching the burner nozzle.

When the device is used to dessicate vines, such as potatoe vines, an auxiliary pipe and nozzle mechanism is mounted on the burner device and discharges raw liquid propane into the vines to be dessicated. The burner ignites the liquid propane and effectively dessicates the vines.

FIGURES OF THE DRAWING

FIG. 1 is a diagrammatic top plan view of a tractor and an agricultural implement having the novel burning devices mounted thereon, FIG. 2 is a perspective view of a novel burner device, FIG. 3 is a cross sectional view taken approximately along lines 3—3 of FIG. 2 and looking in the direction of the arrows, FIG. 4 is a perspective view of the novel burner device incorporating an auxiliary pipe and nozzle device used in vine dessication, FIG. 5 is a side elevational view illustrating a pair of burner devices in use, and FIG. 6 is a sectional view taken approximately along lines 6—6 and looking in the direction of the arrows.

DESCRIPTION OF THE PREFERRED EMBODIMENT

Referring now to the drawings and more specifically to FIG. 1, it will be seen that one embodiment of the novel burner device, designated generally by the reference numeral 10, is illustrated in mounted relation on an implement which is being towed by a tractor T in a conventional manner. FIG. 1 diagrammatically illustrates how a plurality the burner device will be applied to crop rows for the purposes of destroying weeds, insects, soil born micro-organisms and the like.

Referring now to FIG. 2, it will be seen that the burner device 10 is comprised of a generally rectangular shaped burner housing 11 which includes a top wall 12, bottom wall 13, a pair of opposed side walls 14, and a rear wall 15. It will be noted that the burner housing 11 has an open front end or mouth which defines a flame outlet 16.

Referring now to FIG. 3 it will also be noted that the entire interior 17 of the burner housing is unobstructed and that a burner nozzle 18 is mounted on the back wall 15 and projects a small distance therefrom.

The burner nozzle 18 has an orifice 19 at its discharge end and air is supplied to the interior 17 of the burner housing 11 through air inlet openings 20 in the rear and bottom walls. The discharge orifice 19 of the burner nozzle 18 is positioned only slightly forwardly of the rear or back wall 15 so that during operation of the burner device, flame is generated substantially throughout the entire volumetric space defined by the interior 17. In this regard, it will be noted that the vertical dimension of the burner device is only a fraction of either the width dimension or the length dimension of the burner housing so that a wide generally flat flame pattern is generated by the burner device. It will also be noted that the burner housing 11 tapers vertically from the rear wall towards the mouth or outlet 16, as best seen in FIG. 3. Finally, it will be seen that since the nozzle orifice 19 is located closely adjacent the rear wall 15 of the burner housing, the entire top wall 12 of the housing will be is heated as soon as the burner device is operated. The flame will be ejected through the flame outlet during operation of the burner device. The flame characteristics will be dependent on the gas pressure to the burner nozzle.

The fuel which is combusted with the burner device 10 is liquid propane gas which is supplied to the burner nozzle 18 through a supply pipe 21. It will be noted that the supply pipe 21 is of U-shaped configuration including leg 22, leg 23, and bight portion 24. The U-shaped supply pipe 21 is rigidly affixed to the top wall 12 of the burner housing 11 as by welding, and heat is transferred from the wall 12 to the supply pipe during the operation of the burner device. Fuel passing through the U-shaped supply pipe 21 will therefore be vaporized by this transferred heat before the propane reaches the burner nozzle 18. In this regard it will be seen that a major portion of the length of the pipe 21 engages the upper wall 12 of the housing. Therefore effective vaporization of the liquid propane is assured before the propane reaches the burner nozzle.

It will also be noted that the supply pipe 21 also includes a curved U-shaped portion 25 which is connected by fitting 26 to the burner nozzle 18. The other end of the supply pipe 21 is provided with a fitting 27 which is connected to the fitting on a flexible supply conduit 28. The supply conduit 28 is connected to one of a plurality of outlet fittings 29 on an elongated manifold 30. The manifold 30 may be mounted at any convenient location on an implement as best seen in FIG. 1.

The manifold 30 is connected by flexible conduit or line 31 in communicating relation to a tank 32 which may be mounted on a tractor or similar prime mover vehicle. The tank 32 contains liquid propane and supplies a plurality of burner devices supported by an implement during operation of the burner devices.

Means is provided for connecting each burner device with a draw bar. This means includes a substantially flat elongate rectangular plate 33 which is rigidly secured to the U-shaped supply pipe 21 at a location approximately mid-way of the length of the burner housing 11. A vertical bracket 34 is rigidly affixed to the plate 33 and the upper end portion of the bracket has an opening therein which is secured to the lower end portion of an elongate standard 35 by nut and bolt assembly 36. In this regard, it will be noted that the lower end portion of the standard 35 is flattened at 37 and is provided with a suitable aperture for receiving the bolt of the nut and bolt assembly 36. This arrangement permits the housing 11 to be pivoted about a horizontal transverse axis defined by the bolt of the nut and bolt assembly 36.

A connection mechanism is provided for connecting the upper end portion of the standard 35 to the draw bar of an implement to permit rotation of the standard 35 about its longitudinal axis and t permit angular adjustment of the standard relative to the draw bar. This connection mechanism includes an attachment sleeve 38 which is provided with a threaded embossed element 39 for threadedly accommodating set screw 40. It will be seen that the standard 35 projects through the attachment sleeve 38 and is locked in an adjusted position by the set screw 40.

The connection mechanism also includes an attachment sleeve 41 which is rigidly secured to the attachment sleeve 38 in right-angular relationship. The attachment sleeve 41 is provided with a pair of threaded embossed elements 42 each accommodating a pair of set screws 43. The attachment sleeve 41 is positioned on a tool bar TB, which constitutes a component of the draw bar 44, and is locked in place by the set screws 43.

With this arrangement, it will be seen that the standard 35 maybe revolved about its longitudinal axis in the selective positioning of the burner housing. The standard 35 may also be angularly adjusted relative to the draw bar and the housing 11 may be angularly adjusted relative to the standard 35 by loosening and tightening the nut and bolt assembly 36. It will therefore be seen that the burner housing may be adjusted through a wide range of positions to assure effective burning and destruction of weeds, insects, micro-organisms, and the like.

Referring now to FIGS. 1, 5, and 6, it will be seen how the burner devices are arranged in pairs for controlling weeds, insects, micro-organisms and the like. A pair of the burner devices are positioned on opposite sides of a crop row so that flames are delivered to cover the area adjacent the plant base. Thus the burner housings are positioned so that the flames are delivered downwardly and inwardly towards each other and towards the area closely adjacent the plants of the crop row C. It will also be noted that each pair of burners are longitudinally staggered relative to each other so that the combined flame cover the entire drill area.

The desired temperature, velocity and the amount of heat applied is regulated by the gas pressure to the burner devices and the speed of the tractor. Therefore the regulator control assembly R is adjusted for optimum results. When the burner devices are used to control weeds, the tractor will be operated at the selected speed and the temperature, velocity and amount of heat to be applied will be adjusted so the selected gas pressure to the burner devices may be achieved.

It is pointed out that most cultivated row crops will stand more heat, properly applied, than most weeds, vines, grasses, and the like. This is due to the difference in the cell structure, age, size and shape of the crop plant as compared to the weeds. Therefore the flame can be directed to the base of the crop plants, as illustrated in FIG. 6, without injury to the cultivating crop. The flame creates, temporarily, a temperature high enough to dehydrate or rupture the cells of the weed plant and results in the ultimate death of the undesirable weed plant.

Referring again to FIGS. 1 and 5, it will be seen that a burner apparatus is mounted on the draw bar 44 which includes a plurality of rearwardly directed tool bars TB that directly mount the burner devices. The tool bars TB are provided with grounding engaging skids or shoes S that traverse the surface of the ground between the crop rows. It is further pointed out that the burner devices may be mounted on other agricultural implements so that weed, insect, or micro-organism control may be performed simultaneously during planting, cultivation or a similar operation.

Referring now to FIG. 4, it will be seen that an auxiliary burner mechanism 45 is provided for use with each burner device 10. The auxiliary burner mechanism 45 includes an elongate tubular body or pipe 45a which is provided with the nozzle 46 at its forward end. The nozzle 46 has an orifice 47 therein and the rear end of the body 45a is provided with a fitting 48 which is connected to a supply line 49. The supply line 49 is connected to the manifold 30 so that liquid propane gas is supplied to the auxiliary burner mechanism.

The auxiliary burner mechanism 45 is provided with a rectangular bracket 50 which is rigidly secured thereto intermeditate the ends thereof. The bracket 50 is provided with an aperture therein and is positioned in side-by-side relation with the bracket 34 for accommodating the nut and bolt assembly 36. It will therefore be seen that the auxiliary burner mechanism 45 may be clamped to the bracket 34 and to the standard 35. This auxiliary burner mechanism 45 is used during vine dessication for use in dessicating potatoe vines and the like.

During operation of the burner device when incorporating the auxiliary burner mechanism 45, raw liquid propane gas will be discharged directly into the vines to be dessicated while flames will be produced in the usual manner by the burner devices 10. The liquid propane gas discharged from the auxiliary burner device will penetrate to the surface of the soil and will be ignited by the flame produced by the burner nozzle 18 so that complete and effective dessication of the thickly matted vines may be accomplished in a single pass.

In addition to weed control, pest control, and vine dessication the burner device is also effective in controlling plant diseases, including blight and diseases associated with fungi. It will be appreciated that a flame of desired temperature may be directed into the soil to destroy soil borne micro-organisms including spores and the likes. The flame is also effective in preventing germination of weed seeds by directing the flame into the soil at an appropriate pre-emergent time.

The burner device is also effective in controlling weeds in orchards as well as renovation of strawberry and asparagus beds where the old plants may be readily destroyed to stimulate renovation of youthful plants. It is also pointed out that the burner devices may be used in delaying maturity of pollination rows in seed corn production so that the maturity of the pollination rows may be effectively controlled.

Colorado potatoe beetles inflict severe damage in crops and it has been found that the burner device is highly effective in controlling these pests with little or no attendant damage to the environment. The burner devices may also be employed to burn and destroy plastic mulch which obviates the need to physically remove the mulch from the fields. Finally, although not shown in the drawing, a single burner device may be held by an attendant and may be used to control weeds and the like in gardens and lawns.

From the foregoing description, it will be seen that I have provided a novel burner device which is not only of simple and inexpensive construction and operation, but one which functions in a more efficient manner than any heretofore known comparable device.

What is claimed is:

1. A burner device adapted to be mounted on the draw bar on an agricultural implement for use in destroying and controlling weeds, insects, spores, vines, micro-organisms and the like, comprising:

a generally rectangular shaped burner housing including upper, lower, side and rear wall portions and having an open front end defining a flame outlet, said rear wall portion having an opening therein defining an air inlet, said burner housing having a substantially uniform width dimension, an elongate standard, means pivotably connecting one end of said standard to the burner housing adjacent and above the upper wall portion thereof, to permit pivotal adjustment therebetween, means adjustably connecting the other end of said standard to a draw bar to permit rotation of the standard about its longitudinal axis and to permit angular adjustment of the standard relative to the draw bar, an elongate U-shaped supply pipe rigidly mounted on the upper wall portion of said housing, means connecting one end of said supply pipe to a container having liquid propane therein, said U-shaped supply pipe including a pair of leg portions and a bight portion, each of said leg portions engaging the upper wall portion adjacent one side thereof throughout substantially the length of the upper wall portion, so that a major portion of the length of the supply pipe engages the supper wall portion of the burner housing, a burner nozzle mounted on the rear wall portion of said housing and having an orifice disposed in close proximity to the rear wall portion and interiorly of the housing, means connecting the other end of said supply pipe to said nozzle to permit the burner nozzle to produce a flame directed through the open front end of the burner housing whereby liquid propane continuously flowing through the supply pipe will be continuously vaporized by heat transferred from the burner housing.

2. The burner device as defined in claim 1 wherein said lower wall has an air inlet opening therein.

3. Apparatus for controlling weeds, insects, spores, micro-organisms and the like in agricultural row crops, comprising:

a draw bar adapted to be towed by a tractor, a plurality of burner devices, means mounting said burner devices on said draw bar to position a pair of burner devices on opposite sides of a crop row, each burner device including a generally rectangular shaped burner housing having upper, lower side and rear wall portions and having an open front end defining a flame outlet, each of said burner housings being of substantially uniform width, and each housing having an opening in the rear wall thereof defining an air inlet, each burner device including an elongate standard, means pivotally connecting each standard to a burner housing adjacent the mid-portion thereof and above the upper wall portion thereof to permit pivotal movement therebetween, means mounting the other end of each standard or a draw bar, an elongate U-shaped supply pipe rigidly mounted on the upper surface of said housing, means connecting one end of said supply pipe to a container having liquid propane therein, said U-shaped supply pipe including a pair of leg portions and a bight portion, each of said leg portions engaging the upper wall portion adjacent one side thereof throughout substantially the length of the upper wall portion so that a major portion of the length of the supply pipe engages the upper wall portion of the burner housing, a burner nozzle mounted on the rear wall portion of said housing and having an orifice disposed in close proximity to the rear wall portion and interiorly of the housing means connecting the other end of said supply pipe to said nozzle to permit the burner nozzle to produce a flame directed through the open front end of the burner housing whereby liquid propane continuously flowing through the supply pipe will be continuously vaporized by heat transferred from the burner housing.

4. The apparatus as defined in claim 3 wherein the burner devices of each pair of burner devices are longitudinally staggered with respect to each other.

5. The apparatus as defined in claim 3 wherein the lower wall of each housing has an opening, therein defining an air inlet.

6. A burner device adapted to be mounted on the draw bar on an agricultural implement for use in destroying and controlling weeds, insects, spores, vines, micro-organisms and the like, comprising:

a burner housing including upper, lower, side and rear wall portions and having an open front end defining a flame outlet, an elongate standard, means adjustably connecting one end of said standard to the burner housing to permit pivotal adjustment therebetween, means adjustably connecting the other end of said standard to a draw bar to permit rotation of the standard about its longitudinal axis and to permit angular adjustment of the standard relative to the draw bar, an elongate supply pipe rigidly mounted on the upper wall portion of said housing, means connecting one end of said supply pipe to a container having liquid propane therein, said supply pipe being shaped so that a major portion of the length thereof engages the upper wall portion of the burner housing, a burner nozzle mounted on the rear wall portion of said housing and having an orifice disposed in close proximity to the rear wall portion and interiorly of the housing, means connecting the other end of said supply pipe to said nozzle to permit the burner nozzle to produce a flame directed through the open front end of the burner housing whereby liquid propane flowing through the supply pipe will be vaporized by heat transferred from the burner housing and an elongate auxiliary burner mechanism, means mounting said auxiliary burner mechanism or said housing, said auxiliary mechanism having a discharge nozzle at one end thereof positioned adjacent the flame outlet of said housing, means connecting the other end of said auxiliary burner mechanism to a source of liquid propane whereby liquid propane may be discharged from the auxiliary burner into vines and the like and then ignited by the burner nozzle in said housing for effectively dessicating the vines and the like.

* * * * *